United States Patent
Olsson

(10) Patent No.: US 8,047,746 B2
(45) Date of Patent: Nov. 1, 2011

(54) CUTTING-TOOL UNIT HAVING A CHIP, A CHIP HOLDER, AND A DEVICE FOR MOUNTING A CHIP HOLDER

(75) Inventor: Sören Olsson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 1267 days.

(21) Appl. No.: 11/717,171

(22) Filed: Mar. 13, 2007

(65) Prior Publication Data

US 2007/0224005 A1    Sep. 27, 2007

(30) Foreign Application Priority Data

Mar. 14, 2006  (SE) ...................................... 0600581

(51) Int. Cl.
*B23Q 11/10*   (2006.01)
*B23Q 3/157*   (2006.01)

(52) U.S. Cl. .................. 407/11; 408/16; 483/9

(58) Field of Classification Search .............. 408/16, 408/226, 2, 3, 61; 483/8, 9; 407/11
See application file for complete search history.

(56) References Cited

U.S. PATENT DOCUMENTS

| | | | | |
|---|---|---|---|---|
| 3,143,900 A | * | 8/1964 | Oeckl et al. | 408/226 |
| 3,858,892 A | * | 1/1975 | Rutschke et al. | 279/9.1 |
| 4,533,823 A | * | 8/1985 | Vittorio | 235/375 |
| 4,588,339 A | * | 5/1986 | Bilz | 409/234 |
| 4,720,907 A | * | 1/1988 | Rapp | 235/439 |
| 4,742,470 A | * | 5/1988 | Juengel | 700/175 |
| 4,773,800 A | * | 9/1988 | Furuhashi et al. | 409/234 |
| RE32,837 E | * | 1/1989 | Corni | 235/375 |
| 4,856,177 A | * | 8/1989 | Takeuchi et al. | 483/9 |
| 4,864,714 A | * | 9/1989 | Von Haas et al. | 483/1 |
| 4,890,306 A | * | 12/1989 | Noda | 377/15 |
| 5,142,128 A | * | 8/1992 | Perkin et al. | 235/375 |
| 5,257,199 A | * | 10/1993 | Tsujino et al. | 700/160 |
| 5,277,686 A | | 1/1994 | Enbergs | |
| 5,358,360 A | * | 10/1994 | Mai | 408/61 |
| 5,787,018 A | * | 7/1998 | Bolan et al. | 702/33 |
| 6,231,276 B1 | | 5/2001 | Muller et al. | |
| 6,409,439 B1 | * | 6/2002 | Riviere | 409/131 |
| 6,585,628 B1 | * | 7/2003 | Tsung et al. | 483/9 |
| 7,389,205 B2 | * | 6/2008 | Denny et al. | 702/188 |
| 7,431,682 B2 | * | 10/2008 | Zeiler et al. | 483/9 |
| 7,606,682 B2 | * | 10/2009 | Denny et al. | 702/188 |
| 7,695,223 B2 | * | 4/2010 | Collingwood et al. | 409/186 |
| 2005/0169718 A1 | * | 8/2005 | Beckington | 408/61 |
| 2006/0159533 A1 | * | 7/2006 | Zeiler et al. | 408/226 |

FOREIGN PATENT DOCUMENTS

| | | | |
|---|---|---|---|
| DE | 3607771 A1 | * | 9/1987 |
| DE | 3611447 A | * | 10/1987 |
| DE | 3941208 A | * | 6/1990 |
| EP | 155662 A | * | 9/1985 |
| JP | 58149113 A | * | 9/1983 |

* cited by examiner

*Primary Examiner* — Boyer D. Ashley
*Assistant Examiner* — Sara Addisu
(74) *Attorney, Agent, or Firm* — Drinker Biddle & Reath LLP

(57) ABSTRACT

A chip holder and a mounting device for the installation of a chip holder in cutting-tool bodies. The chip holder includes a male thread and one or more through, suitably peripheral recesses for accommodating torque-transferring fingers included in the mounting device, as well as for allowing passage of cooling liquid through a bore formed in the tool body in which bore the holder is placed. The mounting device includes one or more torque-transferring fingers, which have looking hooks in order to provisionally clamp the chip holder upon installation. Furthermore, the invention relates to a cutting-tool unit having an installed chip holder.

11 Claims, 4 Drawing Sheets

CUTTING-TOOL UNIT HAVING A CHIP, A CHIP HOLDER, AND A DEVICE FOR MOUNTING A CHIP HOLDER

This application claims priority under 35 U.S.C. § 119 to Sweden Patent Application No. 0600581-3, filed on Mar. 14, 2006, the disclosure of which is incorporated by reference herein in its entirety.

FIELD OF THE INVENTION

The present invention relates generally to a cutting-tool unit, including a tool body having a bore, which is formed with two sections having different diameters and being axially spaced-apart by a shoulder surface, the narrower one of which includes a female thread, and an information-carrying chip, which is mounted in the narrow section of the bore by locating means. The present invention also relates to a chip holder for such cutting-tool bodies, as well as a device for the mounting of chip holders in cutting-tool bodies.

BACKGROUND OF THE INVENTION

Within the modern technique of cutting or chip removing machining of metallic work pieces, tool systems are utilized that include a large number of tools and tool bodies having different properties and different work tasks. Complete turning, milling and drilling tools, as well as individual tool bodies, may be coupled together with other tool bodies, e.g., adapters and extension details, in order to form complete tools. For this purpose, the individual tool bodies are formed with coupling members included in a universal coupling system common to the entire tool set, e.g., of the type that is commercially available under the trade name COROMANT CAPTO®. In this connection, the different tool bodies generally are formed with through bores, in which there is a female thread for the engagement with coupling details. This bore may also be utilized to feed a cooling liquid or fluid to the active cutting inserts of the tool, with the purpose of cooling and/or lubricating the same. The different tool bodies are stored in an inactive state in at least one magazine adjacent to the machine tool in question, and are picked out individually from the magazine by means of a tool changer, when they are to be mounted in the machine for active operation. The same tool changer also restores the tool body to the magazine after finished operation. In order to make it possible to distinguish different tool bodies, and in order to keep control of the status of the individual tool body, information-carrying chips are built into the tool bodies. More precisely, the chips are mounted in the female thread of the bore mentioned by way of introduction.

Previously, the mounting of the chips has been effected by two washers provided with threads, one of which serves as a stop for the chip, and the other one as a lock member for the chip. Thus, a first washer is screwed in a distance into the narrow section of the bore that has a female thread, in addition to which a chip is fixed or locked by a subsequent locking washer. However, for a plurality of reasons, this mounting technique is inappropriate and troublesome. Thus, it is vital that the chip is located in a predetermined position inside the bore, because otherwise difficulties arise in reading the chip information, since this is carried out by a reader placed in a predetermined position adjacent to the machine. Therefore, in practice, the chip should be located in the immediate vicinity of the shoulder between the narrow and wide sections of the bore, however without projecting from the shoulder surface. Since the internal bore is not visible from the outside of the tool body, the screw-in of the first stop washer, which determines the final, axial position of the chip in the bore, is fussy and difficult to master. If the stop washer is screwed in too far, the chip is located in an erroneous position. Another disadvantage of the known mounting technique is that not only the two washers, but also the chip requires a central hole in order to allow the cooling liquid to pass through the tool body. However, since the narrow section of the bore has a limited cross-section area, the possibilities of constructing the chip and the washers with desirably wide holes are limited. Thus, the manufacturers of the chips have been compelled to limit the size of the central hole in such a way that the cross-section area thereof becomes smaller than the cross-section area of the outlet from which the cooling liquid is fed into the tool body. In other words, the chip and the appurtenant washers form an obstacle to the free flow of the cooling liquid through the tool body.

The present invention aims at overcoming the above-mentioned problems by providing a new chip holder, as well as an expedient mounting device for the mounting of such a chip holder in a tool body. Therefore, an object of the invention is to provide a chip holder that allows the information-carrying chip to be located in a reliable way in a correct, predetermined position, in which an external reader can read the chip information in a distinct and reliable way. It is also an object to provide a chip holder that has a good capability of letting cooling liquid pass in order to, in such a way, reduce or eliminate the flow-obstructing effect of the chip. It is also an object to provide a chip holder that is simple and inexpensive to manufacture, and that increases the latitude to construct the proper chip in an optimal way. The chip holder should also be simple to mount by means of an expedient mounting device.

The invention also aims at providing an expedient device for the mounting of the chip holder according to the invention. In this aspect, an object of the invention is to provide a device that in a reliable way ensures that the chip holder gets a precise, predetermined position in the narrow section of the cooling-liquid bore. An additional object is to provide a mounting device that allows a simple, quick and comfortable mounting of the chip holder, in spite of the fact that the same is not visible from the outside of the tool body.

SUMMARY OF THE INVENTION

The invention is based on the idea of housing the information-carrying chip in a solitary holder or body, which is formed with one or more eccentric recesses having dual tasks, viz. to let cooling liquid pass, as well as to accommodate torque-transferring fingers included in a special mounting device, which in turn is constructed in such a way that the chip holder, by misadventure or in another way, cannot be screwed in further into the narrow section of the cooling-liquid bore than what is determined by, on one hand, locking hooks of the fingers, and on the other hand a front surface formed on the device, which surface is pressable against the shoulder surface between the narrow and wide sections of the cooling-liquid bore.

In an embodiment, the invention provides a cutting-tool unit including a tool body and an information-carrying chip. The tool body includes a bore having a first section and a second section, a diameter of the first section being smaller than a diameter of the second section, the first and second sections being axially spaced-apart by a shoulder surface, the first section including a female thread. The information-carrying chip is located and mounted in the first section of the bore by a holder. The holder includes a center axis, two opposite end surfaces, and a peripheral engagement surface that is concentric with the center axis and is in engagement with the female thread. The holder includes a through recess radially spaced apart from the center axis, the recess accommodating a finger of a mounting device, and allowing passage of a fluid past the holder.

In another embodiment, the invention provides a holder for an information-carrying chip for cutting-tool bodies. The holder includes two opposite end surfaces, a peripheral engagement surface that is concentric with a center axis of the holder, and a through recess that is radially spaced apart from the center axis and accommodates a finger of a mounting device, and allows passage of a fluid past the holder.

In yet another embodiment, the invention provides a device for mounting a chip holder in cutting-tool bodies that include a bore formed with two sections having different diameters and being axially spaced-apart by a shoulder surface, a narrower section of which includes a female thread. The device includes a frame having a central axis, a front surface, and a finger protruding from the front surface, the finger being radially separated from the center axis and having a hook axially spaced apart from the front surface.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
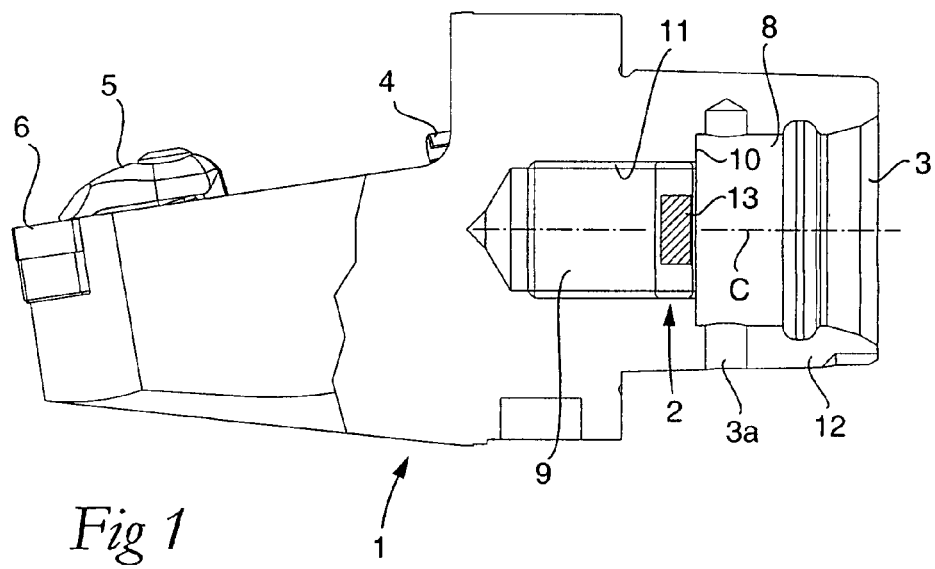
FIG. 1 is a side view partly in section showing a tool body in the form of a turning tool, inside which a chip-carrying holder according to the invention is mounted.
Figure 2:
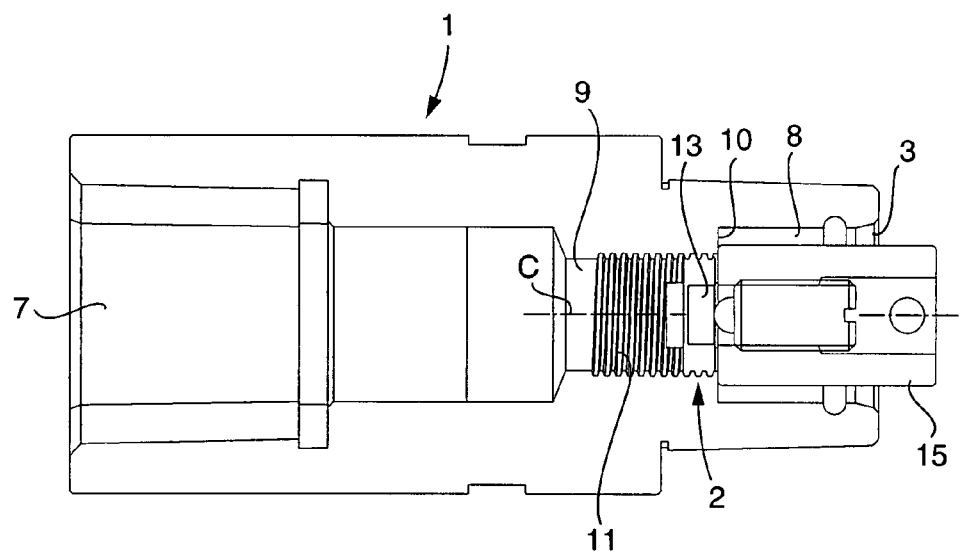
FIG. 2 is a longitudinal section through a tool body in the form of an adapter having a chip holder upon mounting by means of a mounting device according to the invention.

In FIGS. 1 and 2, two different types of tool bodies 1 are shown, viz. a complete turning tool in FIG. 1 and an adapter in FIG. 2. In both cases, the tool body includes an axial bore 2 through which cooling liquid can be fed in the forward direction from a rear inlet 3 (in certain cases also via a side inlet 3a). In the turning tool according to FIG. 1, the front part of the bore 2 ramifies into nozzles 4 through which the liquid can be sprayed toward a cutting insert 6 fixed by a clamp 5 with the purpose of cooling the cutting insert. In the adapter according to FIG. 2, the bore 2 simply ends in a front outlet mouth 7 through which the liquid can pass further to an additional tool body (not shown).

The individual bore 2 includes two different sections 8, 9, which are separated by a ring-shaped, suitably planar shoulder surface 10, which extends perpendicularly to the center axis C of the bore. The rear section 8 has a greater diameter than the front section 9, the front section 9 including a female thread 11, into which a male thread of a coupling detail (not shown) may be screwed in if required. The rear, wide section 8 is included in a sleeve-shaped rear portion 12 of the body 1, which forms a male-like coupling member (e.g., of the type COROMANT CAPTO®), which can be inserted into a corresponding seat, for instance, in a machine tool or an adapter.

In order to identify the individual tool body and keep track of the status thereof, as well as distinguish the same from other tool bodies, an information-carrying chip 13 is mounted inside the bore 2, which chip is inserted into the narrow section of the bore 9 and positioned in the immediate vicinity of the shoulder surface 10, however without protruding rearward from the same.

As has been pointed out by way of introduction, the chip 13 according to prior art has been mounted between two washers, which are formed with circumferential male threads, and an internal or front one of which has served as a stop washer, while a rear one has served as a lock washer.

Figure 6:
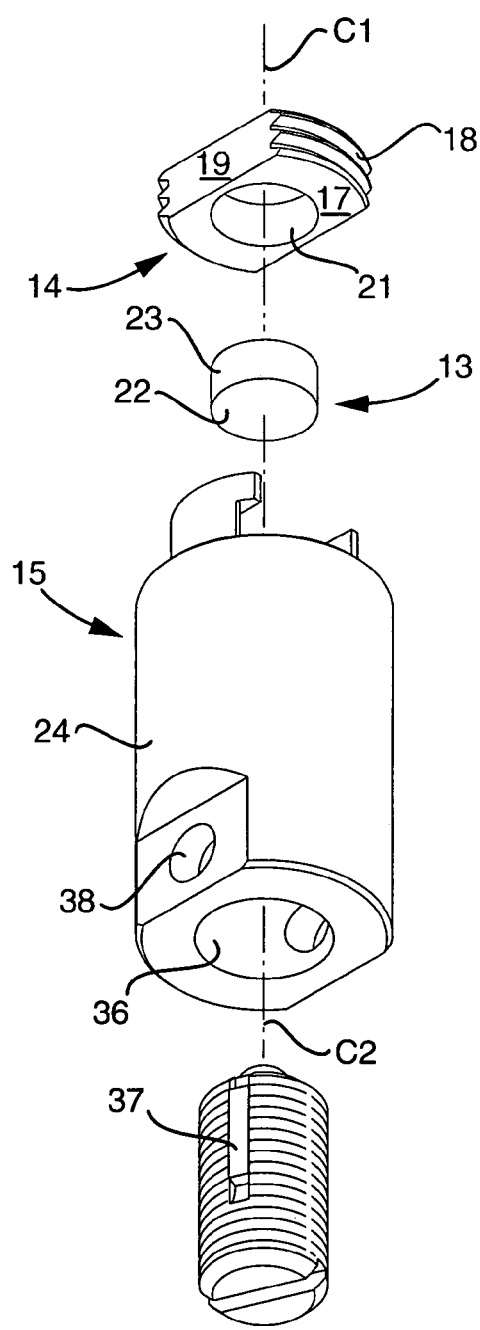
FIG. 6 is a perspective exploded view as viewed from below, showing the chip holder and a chip, as well as the mounting device and a spring cartridge.
Figure 7:
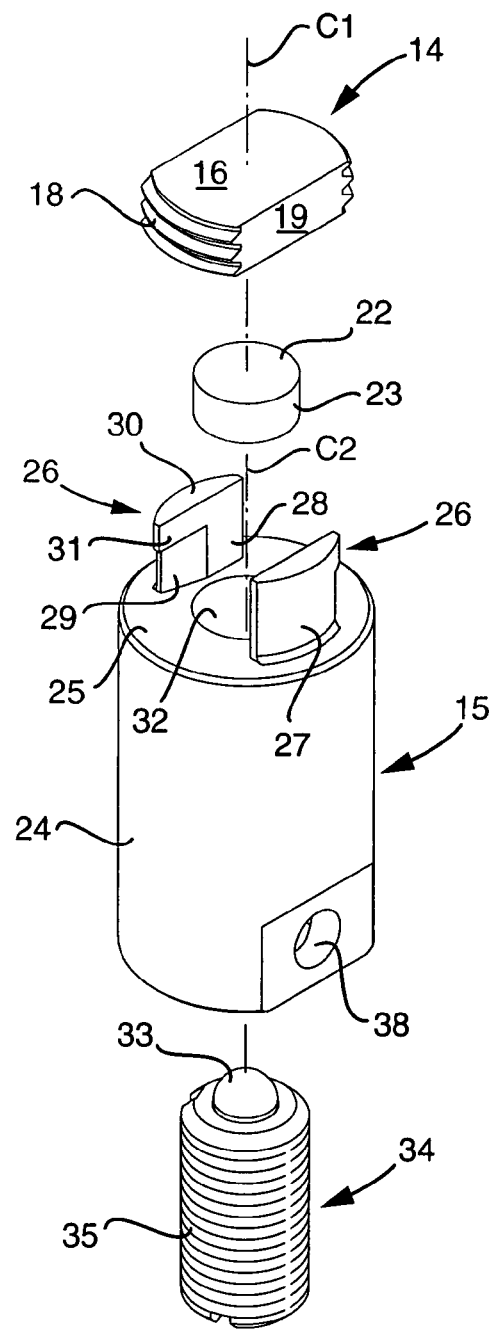
FIG. 7 is an analogous exploded view showing the various components as viewed from above.

Reference is now made to FIGS. 6 and 7, which illustrate the nature of the new chip holder according to an embodiment of the invention, as well as the mounting device according to an embodiment of the invention, which is suitable for the mounting of the chip holder inside the tool body. In the drawings, the chip holder is in its entirety designated 14 and the mounting device designated 15.

Figure 4:
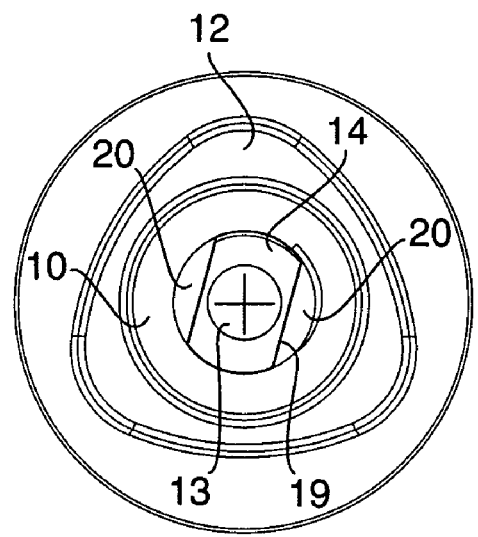
FIG. 4 is an end view A-A in FIG. 3.
Figure 5:
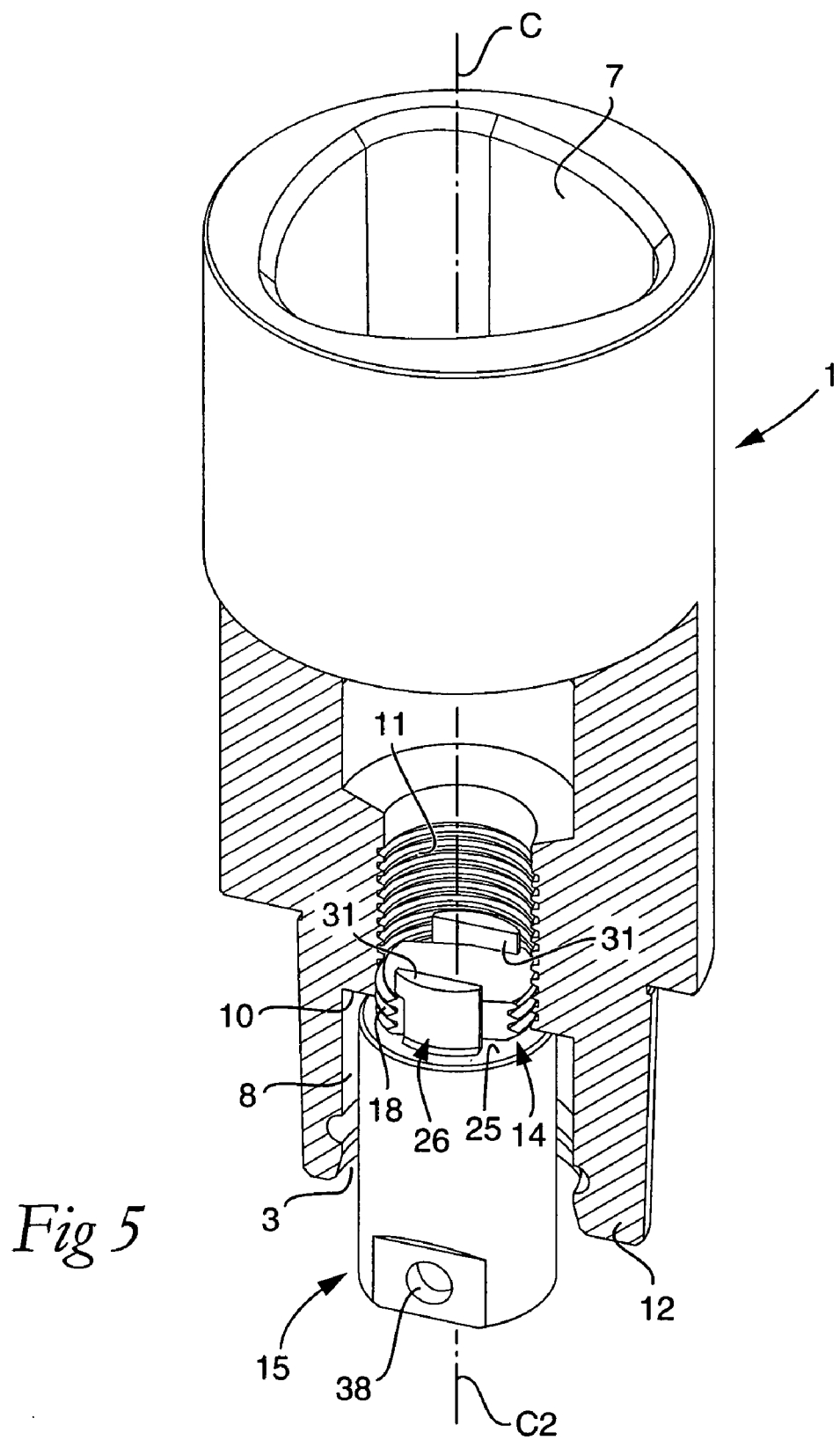
FIG. 5 is a partly cut perspective view of the tool body according to FIG. 2, the chip holder being shown upon mounting by means of the mounting device.

The holder 14 is solitary and includes two opposite end surfaces 16,17 as well as, in this case, a peripheral male thread 18, which is concentric with a center axis C1. The two surfaces 16, 17 may advantageously be planar and parallel to each other. The contour shape of the holder is generally out of round, and in the example shown, elongate. Thus, the shown holder is delimited by two side surfaces 19, which are planar and parallel to each other. In relation to an imaginary, circumscribed circle (not shown), the individual side surface 19 delimits a peripheral recess. Thus, as is seen in FIG. 4, the individual side surface 19, together with the inside of the narrow section 9 or the thread 11 of the bore, delimits a recess or space 20, which has a segment- or crescent-like cross-section shape, and through which cooling liquid can pass freely toward the front end of the tool body.

In the holder 14 (see FIG. 6), a cylindrical hollow space 21 is formed, which mouths in the end surface 17 (but not in the end surface 16), and has the purpose of housing the likewise cylindrical chip 13. The basic shape of the chip is conventional so far that it is pulley-like and defined by two planar end surfaces 22 and one cylindrical envelope surface 23. However, in one respect, the shown, preferred embodiment of the chip differs from previously known chips used in tool bodies, viz. so far that the chip lacks any through hole. This advantageous design of the chip is feasible as a consequence of the fact that the cooling liquid can pass through the spaces 20 on both sides of the chip holder 14.

The chip 13 as well as the holder 14 is flat. Thus, the thickness of the holder 14, as determined by the distance between the surfaces 16, 17, is smaller than the width thereof, as determined by the distance between the side surfaces 19. In this connection, the two peripheral recesses, which are defined by the side surfaces 19, form interruptions in the male thread, which in its entirety is designated 18. In other words, the male thread is in the form of two part threads at the opposite short ends of the holder.

In practice, the chip 13 is fixed in the hollow space 21 in a suitable way, e.g., by agglutination.

The mounting device 15 includes a cylindrical and tubular frame 24 having a central axis C2 and a front surface 25, which advantageously is planar. Two fingers 26 radially spaced-apart from the center axis C2 extend axially outward from the front surface 25. While the outside 27 of the individual finger has an arched, cylindrical shape, the inside is formed with two part surfaces 28, 29, one of which, viz. the part surface 28, extends all the way between the front surface 25 of the frame and the free end 30 of the finger. Both part surfaces 28, 29 are advantageously planar. The second part surface 29 forms an obtuse angle with the first part surface 28, and is shorter than the same by ending in a corbelling 31, which forms a looking hook in the vicinity of the free end of the finger. When the chip holder 14 is inserted between the two fingers 26, the same is freely axially movable in relation to the fingers as long as the side surfaces 19 are parallel to the part surfaces 28 (and possibly in contact with the same). However, if the mounting device is turned a distance in relation to the chip holder so that the side surfaces 19 thereof contact the part surfaces 29, the two hooks 31 will grip and catch or lock the chip holder, so far that the same no longer can be spaced apart axially from the frame 24.

Figure 3:
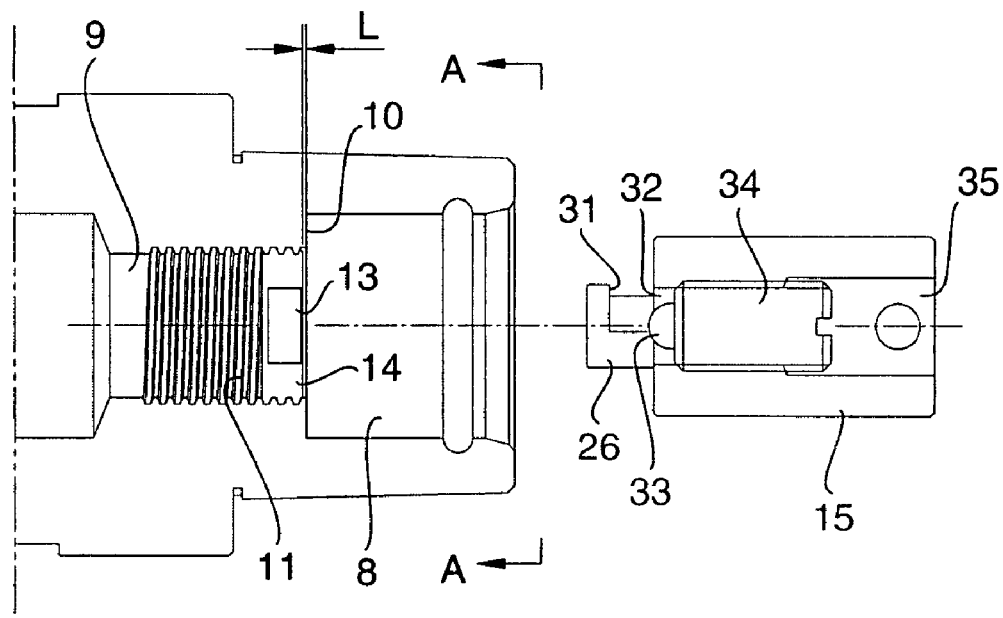
FIG. 3 is a partial longitudinal section through the rear part of the tool body according to FIG. 2, the mounting device being shown separated from the tool body.

In the front surface 25 of the frame 24, a through hole 32 mouths (see also FIG. 3) for a spring-loaded plunge 33, e.g., a ball, which is included in a cartridge designated 34. This cartridge 34 has an external thread 35 by means of which the same can be tightened in an internal thread in a central hollow space 36 in the frame 24. Inside the cartridge, there is a compression spring (not visible), which continuously loads the plunge 33. As illustrated in FIG. 6, a border 37 of plastic or rubber may be countersunk in the envelope surface of the cartridge, which provides a frictional resistance against rotation of the cartridge. In other words, the border 37 counteracts unintentional unscrewing of the cartridge.

Reference is now made to FIGS. 2-5, which illustrate the function of the chip holder and the mounting device. When the chip and the chip holder are to be mounted inside the tool body 1, the chip holder is applied by being inserted axially— or laterally—between the two fingers 26 of the mounting device 15, with the side surfaces 19 of the holder in contact with the part surfaces 28 of the fingers. Next, the holder is turned so that the side surfaces 19 contact the angled part surfaces 29. In such a way, the holder is caught behind the hooks 31 and is kept pressed against the same by means of the spring-loaded plunge 33. In this state, the holder cannot unintentionally be removed from the mounting device.

With the chip holder 14 provisionally clamped in the way described above, the mounting device 15 is inserted into the rear section or hollow space 8 (see FIG. 5) of the tool body until the male thread 18 of the chip holder engages the female thread 11. Manual turning or rotation of the mounting device 15 means that the chip holder successively is screwed in axially into the female thread, more precisely to a position where the front surface 25 of the mounting device contacts the shoulder surface 10. In this context, it should be noted that the threads 11, 18 are constructed in such a way that the side surfaces 19 of the chip holder are pressed against the inclined part surfaces 29 behind the hooks 31, when the holder is screwed in into the bore. However, if the mounting device is turned a distance in the opposite direction, the part surfaces 29 will clear from the side surfaces 19 of the holder until the part surfaces 28 are abutted against the side surfaces 19. In doing so, the holder will go free from the looking hooks 31 so that the fingers can be drawn out of the spaces 20.

In order to allow the mounting device to transfer large torques to the chip holder, the mounting device is formed with transverse holes 38 into which a suitable means, e.g., a bar, can be inserted. In this connection, the male thread 18 of the chip holder advantageously may be coated with a sticky or semi-plastic medium, which counteracts unintentional unscrewing of the holder from the female thread. Naturally, this medium offers a certain resistance also upon screwing-in.

By the fact that the distance between the front surface 25 of the mounting device and the looking hooks 31 is exactly predetermined, the holder and the chip will automatically be located in the correct position when the mounting device is arrested in the inner end position thereof by the fact that the front surface 25 contacts the shoulder surface 10. Therefore, in the mounted state thereof according to FIG. 3, the chip 13 will always be located at a predetermined distance L inside the shoulder surface 10. In practice, the distance L may be 0.5 mm. In addition to be located in the correct position in a repeatable way, the chip holder according to the invention, in combination with the described mounting device, has the advantage that it can be mounted in a simple and convenient way, in spite of the hidden position thereof inside the tool body. An additional advantage of the chip holder according to the invention is that the two peripheral recesses delimited by the side surfaces of the holder can be formed with an ample cross-section area, something which eliminates the forcing need for a central passage through the chip (without excluding the possibility of such a passage). In other words, the latitude to construct the chip in an optimal way is increased.

The invention is not limited solely to the embodiments described above. Thus, instead of forming the chip holder with one or more peripheral recesses, the holder may have the form of a pulley having an unbroken, cylindrical circumference, one or more recesses in the form of through holes being formed in the pulley somewhere between the center axis and the circumference. However, irrespective of where the eccentric recess or recesses are located, the holder is solitary in the sense that it does not need to co-operate with, for example, stop and locking washers, in order to fix the chip in the correct position. The holder, which in practice may be made of different materials, such as metal or plastic, also may be in the form of a capsule that entirely contains the chip. In other words, the chip does not need to be mounted in an open seat.

Furthermore, it is feasible to replace the form-stiff male thread 18 (in the example, the two part threads at the short ends of the holder) by a soft material, e.g., plastic or rubber, into which the female thread can cut in. In other words, the holder may be made with a peripheral engagement surface, which either is in the form of a male thread or is a part of a peripheral, deformable ring (or ring part) into which the female thread may penetrate.

The described mounting device may also be modified in various ways. For instance, it is feasible to make the device with only one finger, although in practice, the shown embodiment with two fingers is preferred. In this connection, the concept "looking hook" should be interpreted in a wide sense. Thus, the looking hook may be realized in most different ways, provided that the same, on one hand, has the capability of preventing uncontrolled axial movement of the holder in connection with screwing-in, and on the other hand can release the grip thereof of the holder when this is to be removed. Furthermore, instead of a spring-loaded plunge, other means may be used for clamping the chip holder in connection with the installation of the chip holder.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A cutting-tool unit, comprising:
   a tool body including a bore having a first section and a second section, a diameter of the first section being smaller than a diameter of the second section, the first and second sections being axially separated by a shoulder surface, the first section including a female thread; and
   an information-carrying chip located and mounted in the first section of the bore by a holder, the holder including a center axis, two opposite end surfaces, and a peripheral engagement surface that is concentric with the center axis and is in engagement with the female thread, the holder including a surface which, together with a surface of the first section of the bore, defines a passage radially spaced apart from the center axis, the passage accommodating a finger of a mounting device, and allowing a fluid past the holder.

2. A holder for an information-carrying chip for cutting-tool bodies, comprising two opposite end surfaces, a peripheral engagement surface that is concentric with a center axis of the holder, and a surface which, together with an inside surface of a bore in a tool body, defines a passage that is radially spaced apart from the center axis and accommodates a finger of a mounting device for mounting the holder in the bore of the tool body, and allows a fluid past the holder.

3. The holder according to claim 2, the holder being formed with a plurality of passages, which individually are radially spaced apart from the center axis.

4. The holder according to claim 2, wherein the passage is peripherally positioned and forms an interruption in the peripheral engagement surface.

5. The holder according to claim 2, wherein the surface which defines the passage is planar.

6. The holder according to claim 3, the holder being formed with two diametrically opposed passages, the surfaces which define the respective passages being planar and parallel.

7. The holder according to claim 6, wherein the engagement surface is a male thread.

8. A device for mounting a chip holder in cutting-tool bodies, the cutting-tool bodies including a bore formed with two sections having different diameters and being axially separated by a shoulder surface, a narrower section of which includes a female thread, the device comprising a frame having a central axis, a front surface, and a finger protruding from the front surface, the finger being radially separated from the center axis and having a hook axially spaced apart from the front surface.

9. A device for mounting a chip holder in cutting-tool bodies, the cutting-tool bodies including a bore formed with two sections having different diameters and being axially separated by a shoulder surface, a narrower section of which includes a female thread, the device comprising a frame having a central axis, a front surface, and two fingers protruding from the front surface, each finger being radially spaced-apart from the center axis of the frame and having a hook axially spaced-apart from the front surface.

10. A device for mounting a chip holder in cutting-tool bodies, the cutting-tool bodies including a bore formed with two sections having different diameters and being axially separated by a shoulder surface, a narrower section of which includes a female thread, the device comprising a frame having a central axis, a front surface, and a finger protruding from the front surface, the finger being radially separated from the center axis and having a hook axially spaced apart from the front surface, wherein an inside of the finger includes a first, planar part surface, which extends up to a free end of the finger, and a second part surface, which is oriented at an obtuse angle to the first part surface and is shorter than the first part surface in order to provide a corbelling, which forms the hook.

11. The mounting device according to claim 9, comprising a spring-loaded plunge arranged between the two fingers to hold the chip holder resiliently clamped against the hooks of the fingers.

* * * * *